United States Patent
Currie

Patent Number: 5,491,617
Date of Patent: Feb. 13, 1996

[54] ILLUMINATED FLUID TAP

[76] Inventor: Joseph E. Currie, R.F.D. #8, 17 Lawrence Rd., Hudson, N.H. 03051

[21] Appl. No.: 284,976

[22] Filed: Aug. 4, 1994

Related U.S. Application Data

[63] Continuation-in-part of Ser. No. 59,532, May 12, 1993, abandoned.

[51] Int. Cl.⁶ ..................................................... F21V 33/00
[52] U.S. Cl. ............................ 362/96; 362/32; 362/253; 362/806; 222/113
[58] Field of Search .......................... 40/331, 332, 547; 222/113; 362/32, 96, 101, 253, 806

[56] References Cited

U.S. PATENT DOCUMENTS

| | | | |
|---|---|---|---|
| 2,726,116 | 12/1955 | Barber | 362/96 |
| 3,165,966 | 1/1965 | Pribyl | 239/18 |
| 3,894,689 | 7/1975 | Billingsley | 239/18 |
| 4,749,126 | 6/1988 | Kessener et al. | 362/96 |
| 4,901,922 | 2/1990 | Kessener et al. | 362/32 |
| 4,936,506 | 6/1990 | Ryan | 239/18 |
| 5,165,777 | 11/1992 | Kira | 362/96 |
| 5,171,429 | 12/1992 | Yasuo | 362/32 |

*Primary Examiner*—Ira S. Lazarus
*Assistant Examiner*—Alan B. Cariaso
*Attorney, Agent, or Firm*—Richard C. Litman

[57] ABSTRACT

An illumination device illuminates a tap handle and an area proximate to a tap outlet. The device illuminates a stream of fluid flowing from the tap outlet and the receptacle into which the fluid flows when the tap handle opens the tap to release the fluid. The tap handle actuates a tilt switch adjacent to the tap handle. The device illuminates the tap handle when there is no fluid flow. Light from lamps contained within the device is communicated to the tap outlet and tap handle by separate fiber optic lines. Light from the lamps is colored by a continuously rotating color wheel for aesthetic effects. The device includes a capacitor for generating a time delay to prevent false control signals from being relayed to the lamps.

17 Claims, 5 Drawing Sheets

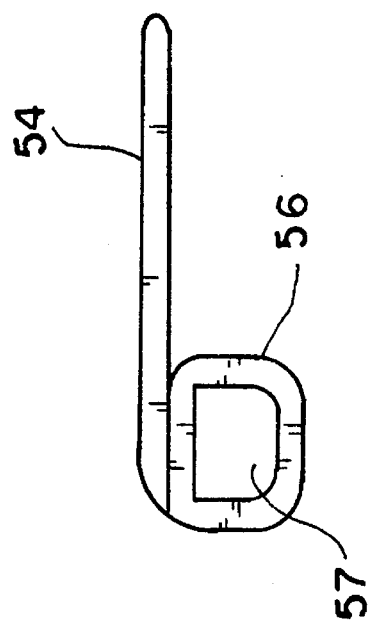
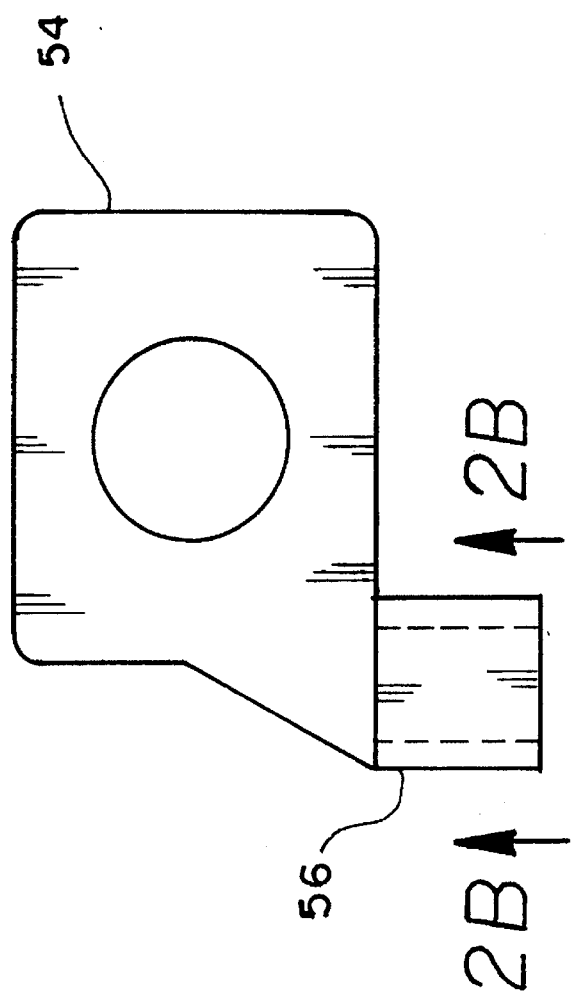
FIG. 2B
FIG. 2A

ILLUMINATED FLUID TAP

RELATED APPLICATION

The present patent application is a continuation-in-part of application Ser. No. 08/059,532 (filed on May 12, 1993) now abandoned.

FIELD OF THE INVENTION

The present invention relates generally to illumination devices, and more specifically to devices providing illumination of a tap handle and an area proximate to a tap outlet.

DESCRIPTION OF THE PRIOR ART

Illumination of water and other fluids have been known for fountains and other water displays. U.S. Pat. No. 2,726,116 issued to John E. Barber on Dec. 6, 1955; U.S. Pat. No. 3,165,966 issued to John P. Pribyl on Jan. 19, 1965; U.S. Pat. No. 3,894,689 issued to Marvin A. Billingsley on Jul. 15, 1975 all disclose illumination systems for water fountain displays.

U.S. Pat. No. 4,749,126 issued to H. P. M. Kessener et al. on Jun. 7, 1988 discloses a liquid outlet wherein light is guided to be introduced into a fluid stream at the outlet to provide lighting effects.

U.S. Pat. No. 4,901,922 issued to H. P.M. Kessener et al. on Feb. 20, 1990 discloses an apparatus where light is introduced into a fluid stream closely adjacent to the formation of the stream. The light is varied according to the temperature.

U.S. Pat. No. 4,936,506 issued to James E. Ryan on Jun. 26, 1990 discloses a swimming pool fountain including an illuminated fountain spray.

U.S. Pat. No. 5,165,777 issued to Hirohi Kira on Nov. 24, 1992 discloses an illuminated fountain having a mirror for reflecting light from a lamp through a bottom panel of a water chamber. A pressure switch is in fluid connection with the inlet to the water chamber so that current is delivered to the lamp only when water is flowing into the chamber.

U.S. Pat. No. 5,171,429 issued to Takashi Yasuo on Dec. 15, 1992 discloses an apparatus for discharging water wherein light is emitted to the output water so as to allow users to visually identify the characteristics of the output water. The apparatus includes sensors for determining such characteristics as temperature, flow, pH and hardness of water. An LED emits light in response to these sensed characteristics. The light is transmitted to the water outlet port via an optical fiber.

None of the above noted patents, taken either singly or in combination, disclose the arrangement of features in the instant invention as disclosed in the present application.

SUMMARY OF THE INVENTION

By the present invention, improved fluid illumination devices are disclosed. The fluid illumination device comprises a light source; a first light conduit connecting a tap handle to the light source; a second light conduit connecting the outlet of the tap to the light source; and a switch adjacent to the tap handle and communicating with said light source. The switch activates the second light conduit when the tap is actuated. The tap handle is illuminated by the first light conduit, and the second light conduit illuminates the area proximate to the tap outlet. The fluid from the outlet of the tap and the fluid container are both illuminated by the second light conduit.

The device illuminates both the tap handle, the fluid flowing from the tap outlet, and the fluid container. The latter feature of the device is triggered when the fluid flow is activated in the normal manner. The device may be adapted for decorative and/or advertising purposes. The device may also be made portable for external attachment to a tap or spigot on a beer keg or other beverage dispenser. Specific colors may be provided for specific occasions as desired (e.g., green for St. Patrick's Day celebrations).

Accordingly, one of the objects of the present invention is to provide an improved fluid illumination device for illuminating the fluid flow from a tap outlet and the fluid receptacle.

Another object of the present invention is to provide an improved fluid illumination device which operates automatically upon actuation of the fluid control valve.

An object of the present invention is to provide an illumination device which alternately illuminates the tap handle and the fluid receptacle depending on the actuation of the fluid control device.

These and other objects of the present invention will become readily apparent upon further review of the following specification and drawings.

BRIEF DESCRIPTION OF THE DRAWINGS

FIGS. 2a and 2b are top and partial side views of the switch mounting bracket of the present invention.

Similar reference characters denote corresponding features consistently throughout the several figures of the attached drawings.

DETAILED DESCRIPTION OF THE PREFERRED EMBODIMENTS

Figure 1:
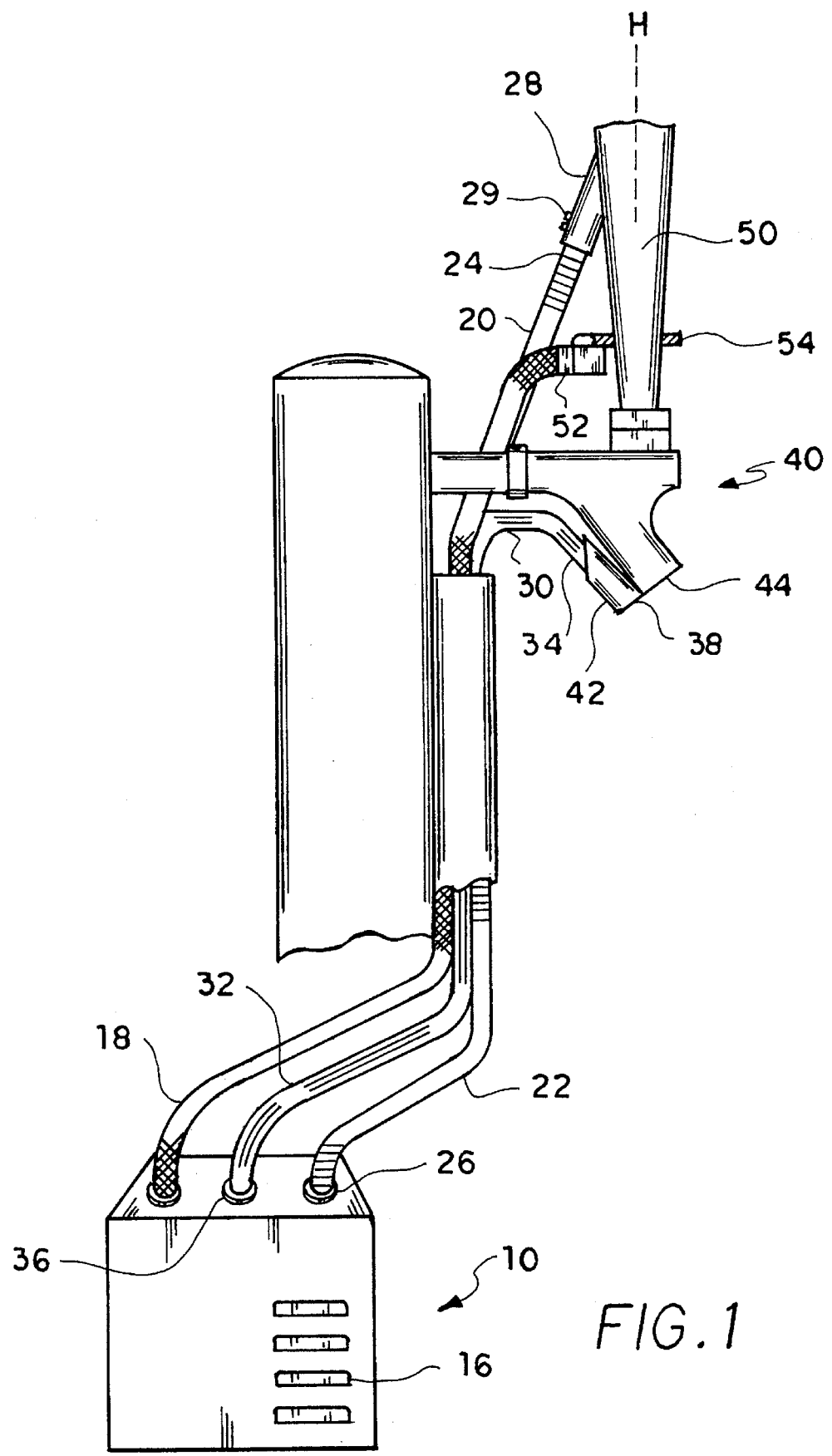
FIG. 1 is a side perspective view of a preferred embodiment of the present invention installed in a beverage dispenser assembly.

Referring now to the drawings, the present invention relates to a device providing for the illumination of fluid flow from a tap outlet, as well as the fluid receptacle. As shown in FIG. 1, beverage dispensing tap 40 includes a tap sleeve 42 which serves as an outlet for the fluid and a tap handle 50. Handle 50 may be formed from plastic, lucite or acrylic. Tap handle 50 is illuminated by either white light or colored light from a light conduit such as fiber optic cable line 20. When the illuminated handle 50 is actuated to dispense liquid beverages, such as lagers and ales, from the outlet of tap 40, a white or colored light is directed to an area proximate to the outlet of tap 40 by another light conduit, fiber optic cable line 30, anchored to tap sleeve 42. Tap sleeve 42 may be soldered, brazed or welded to a metal tap 40. Tap sleeve 42 may also be fastened to the tap by a clip or bracket or epoxy cement. Fiber optic cable lines 20 and 30 and control line 18 may be confined to a wiring harness sheath before tap 40.

Light from fiber optic cable 20 illuminates tap handle 50, while light from fiber optic cable 30 illuminates both the fluid dispensed from the tap and the container into which the fluid flows. An aesthetically pleasing appearance is imparted to the dispensing tap 40 by the present invention. An illuminating light can be applied alternately to sleeve 42 and handle 50 in order to limit the effect of an illuminated handle 50 from being a distraction to the illumination of the draught. The illuminating light may be either a single color or a changing spectrum of color.

Handle 50 preferably includes optic mounting insert 28 and set screw 29 for accepting the output end 24 of fiber optic line 20. Mounting insert 28 is preferably set 120 degrees from the vertical axis H to direct the illumination from fiber optic line 20 into tap handle 50. The distal end of mounting insert 28 includes a set screw 29 threaded through the wall of insert 28 to secure the fiber optic cable 20 in place.

Handle 50 also preferably includes a switch 52, switch bracket 54 and a switch holder 56, where the switch 52 actuates light source 10 for second fiber optic line 30 when tap handle 50 is operated to dispense liquid from the tap 40. Switch 52 is preferably a tilt switch, which includes a ball held within a tubular metal case with a contact at one end which is electrically insulated from the rest of the case. When the switch is tilted downwardly, the ball rolls to the lower end of the metal case to complete an electrical connection between the metal case and the contact. Tilt switch. 52 sends a signal through control line 18 to light source actuate the light source 10 for fiber optic line 30.

Tilt switch 52 is housed in the switch holder section 56 of switch bracket 54. As shown in FIGS. 2a and 2b, switch bracket 54 is preferably made from a thin section of aluminum, and includes a central opening for receiving the shaft of handle 50. Switch holder 56 is disposed at one end of bracket 54, and includes aperture 57 for accepting tilt switch 52. The metal case of tilt switch 52 must be isolated from the bracket 54 in order to prevent the formation of electrical bypass paths for tilt switch 52.

Various components of the fluid illumination device of the present invention are contained in a ventilated light source 10. Light source 10 may receive electrical power from any conveniently located power source. Electrical power may be transformed to a lower voltage for the operation of the various components of the present invention by means of transformer 72 within the light source 10.

Figure 3:
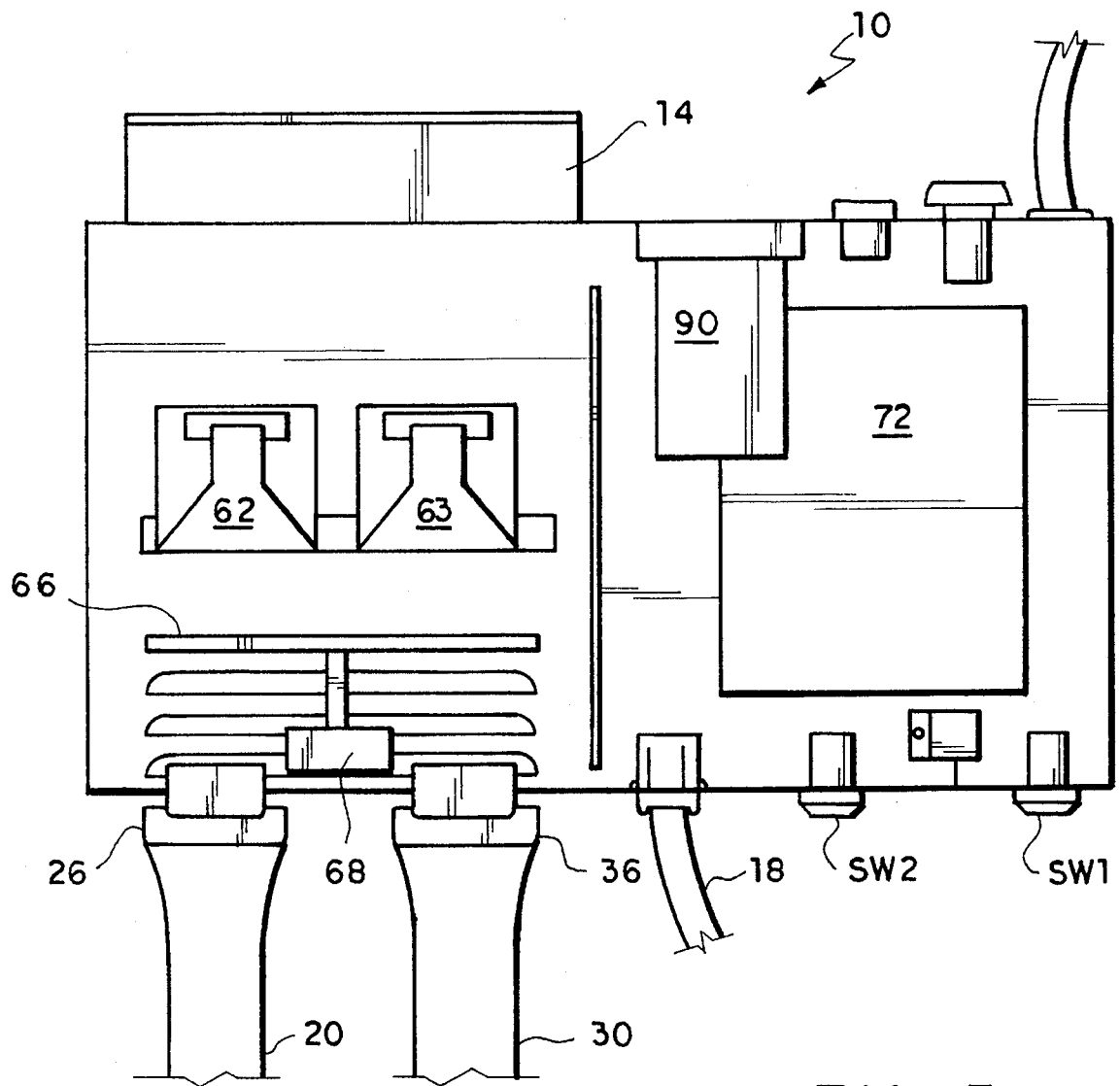
FIG. 3 is a top inside view of the light source in accordance with a preferred embodiment of the present invention.

As shown in FIG. 3, light source 10 preferably includes two separate lamps 62 and 63. Lamp 62 directs light to the input end 22 of fiber optic cable 20, and lamp 63 directs light to the input end 32 of fiber optic cable 30. Fiber optic cable line 20 extends from the bushing 26 in light source 10 to tap handle 50, and fiber optic cable line 30 extends from the bushing 36 in light source 10 to an area adjacent to the tap outlet. The fiber optic cable 30 extends through a liquid proof, sealed passage, and extends substantially axially along the tap sleeve 42 to terminate in a optical lens cap 38 immediately adjacent the outlet 44 of tap 40. Lens cap 38 is preferably hermetically sealed to protect the output end 34 of fiber optic cable 30 from environmental damage.

Tap handle 42 is illuminated by the light from fiber optic cable 20 and lamp 62 when the tap is idle. Tilt switch 52 sends a signal to the light source 10 upon actuation of tap handle 42 to extinguish lamp 62 and energize lamp 63. Lamps 62 and 63 may be high intensity halogen projector bulbs or other suitable light producing devices. Fan 14 and vents 16 serve to cool lamps 62 and 63, as well as providing cooling for other electrical devices (e.g., motor 68) within light source 10. The activation of the lamp 63 causes light to be transmitted through fiber optic cable 30, to be emitted from the output end 34 of the cable 30. The resulting light serves to illuminate the stream of fluid flowing from the outlet of the tap 40 and the fluid receptacle.

The light from lamps 62 and 63 of light source may be colored by a dichroic color wheel 66, which may include differently colored quadrants or sections. Accordingly, the present invention is preferably arranged to include a drive motor 68 to continuously rotate the color wheel 66 so that a changing spectrum of color is interposed between second lamp 63 and the input end 32 of the fiber optic cable 30. Alternatively, a single color setting may be selected for illumination. The resulting light at the output end 34 of the fiber optic cable 30, will serve to illuminate the liquid flowing from the outlet of tap 40 with a changing spectrum of light. Motor 68 may also turn the color wheel 66 between lamp 62 and the input end 22 of the fiber optic cable 20 to illuminate tap handle 50 with a changing revolution of color.

Figure 4:
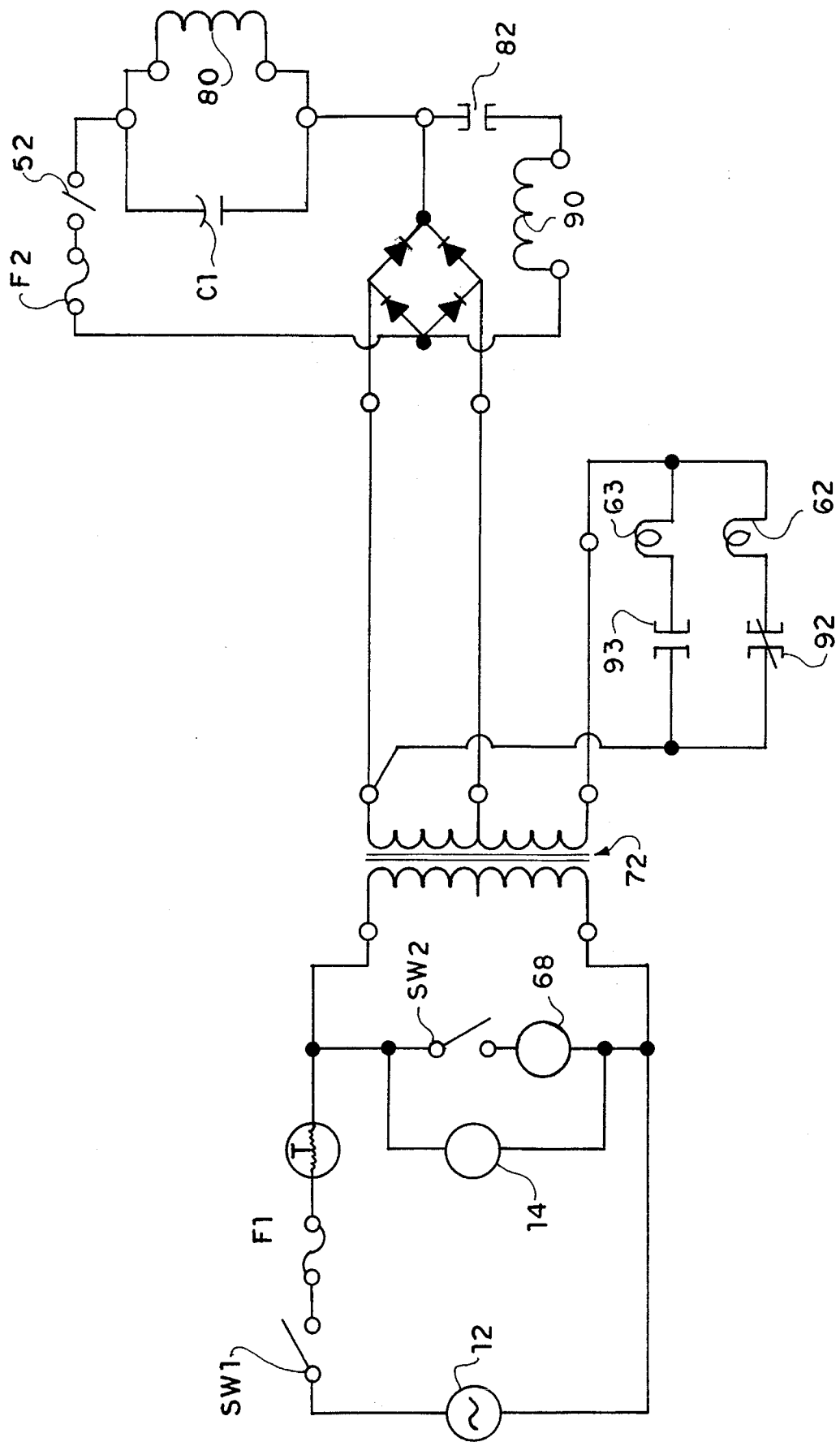
FIG. 4 is a schematic diagram of the light source in the preferred embodiment of the present invention.

FIG. 4 shows a circuit diagram of a preferred embodiment of the instant invention. The values shown in the diagram may be modified according the specific operating parameters required for the environment. When main switch SW1 of light source 10 is closed, power flows through the 10 ampere fuse F1 and the 155° thermal cut-off protector to the primary winding of a 110 to 20 $V_{AC}$ step down transformer 72. Motor 68 and fan 14 are connected in parallel with main switch SW1 and transformer 72. Motor 68 rotates the dichroic color wheel 66, and is actuated by motor switch SW2.

Power from the secondary winding of transformer 72 energizes lamps 62 and 63 across the contact switches 92 and 93, respectively. Power from one-half of the secondary winding of power transformer 72 (i.e., 10 $V_{Ac}$) is applied to the ac connections of a full wave bridge rectifier. The rectifier is connected to a 250 mA fuse F2 and tilt switch 52. When tilt switch 52 closes, capacitor C1, which is arranged parallel to relay 80, begins charging. Capacitor C1 is preferably 680 µf. Relay 80 does not energize until the energy of capacitor C1 rises to the energizing voltage of reed relay 80. A time delay is effectively imposed on relay 80 in order to prevent relay 80 from operating until tilt switch 52 stabilizes. As noted earlier, tilt switch 52 operates using a metal ball within an insulated casing, and, when the switch is tilted, the metal ball rolls to the lower end of the metal case to complete an electrical connection. The ball may bounce and cause spurious contacts when it rolls to the lower end. The time delay created by the parallel capacitor C1 eliminates false and unwanted relay switching operations from reed relay 80. This assures proper illumination of tap handle 50 and the fluid from tap outlet 44.

Relay 80 is preferably a reed relay in order to limit the amount of current drawn through the tilt switch 52 to enhance the operating life of tilt switch 52. A relay 90 controlling contact switches 92 and 93 may be substituted for reed relay 80 in the delay circuit with capacitor C1. However, relay 90 draws more current through tilt switch 52 than reed relay 80. Arcing and carbon build-up resulting from the operation of tilt switch 52 can be reduced by using the lower current requirements of reed relay 80. In a reed relay, two strips of magnetic material sealed inside a glass tube are caused to come into contact by the magnetic field of a surrounding coil that is energized.

Once reed relay 80 closes contact 82, which is normally open, power relay 90 is energized. The operation of relay 90 controls two contacts, normally closed (n.c.) contact 93 and normally open (n.o.) contact 92. When relay 90 is energized, n.c. contact 93 opens, and n.o. contact 92 closes, thereby energizing lamp 63, and extinguishing lamp 62 in the relay operation. When tilt switch 52 is opened again, relays 80 and 90 are de-energized, and contacts 92 and 93 go back to their normal contact position. Lamp 62 becomes energized, and lamp 63 is extinguished by the relay operation.

Figure 5:
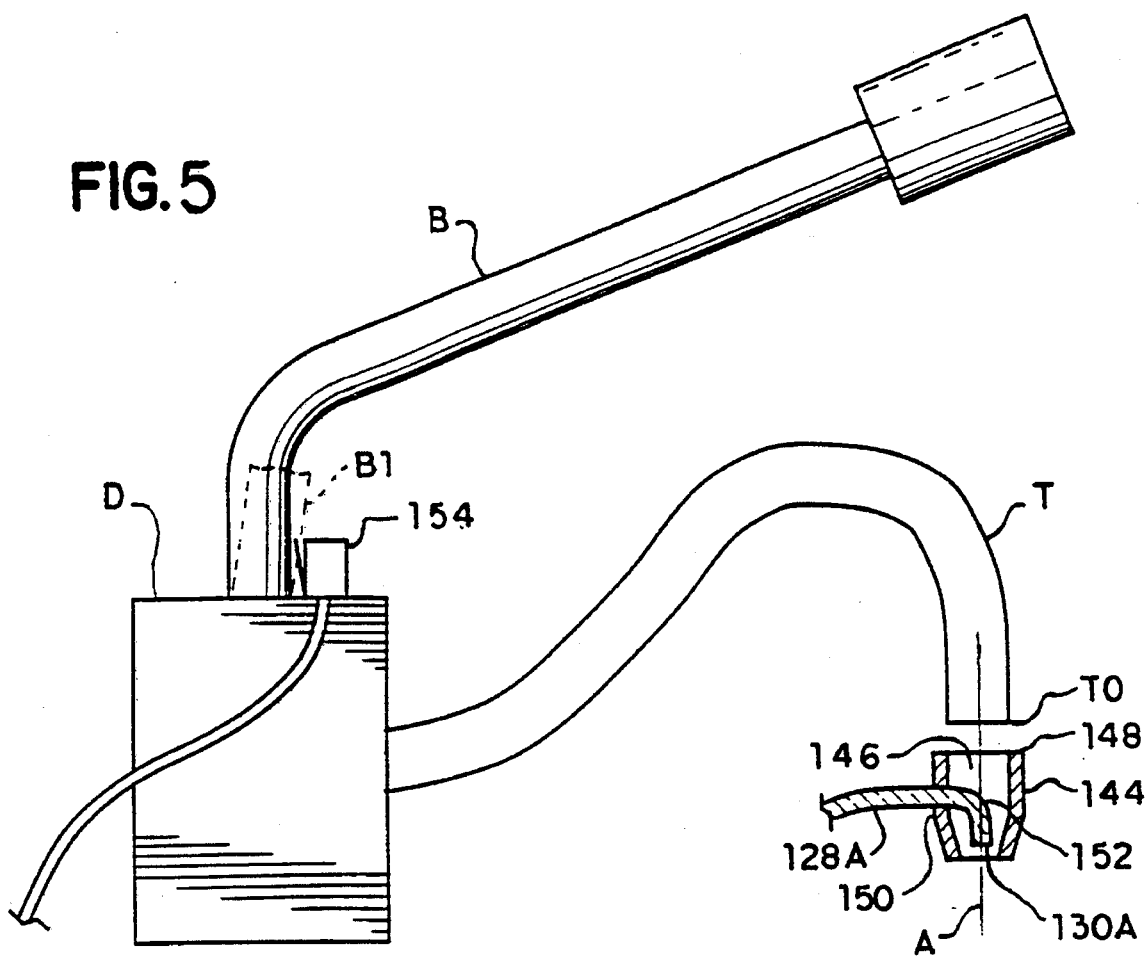
FIG. 5 is a side view of a beverage dispensing tap, showing the arrangement of portable components of a second embodiment of the present invention.

FIG. 5 discloses another embodiment of the present invention, which provides for a portable device for providing direct illumination to a fluid flow from a tap or other fluid outlet. In FIG. 5, a beverage dispenser D having a tap T, for the dispensing of beer, soda or other beverages, is shown. For various reasons (e.g., the disassembly and cleaning of the apparatus), it may not be desirable to provide a permanently installed fiber optic cable along the tap T of such a dispenser D. Accordingly, a portable illumination nozzle 144 is attached to the outlet end TO of the tap T. Nozzle 144 includes an axial opening 146 therethrough, with an upper end 148 which may be slipped over the outlet end TO of the tap T. A fiber optic cable 128a extends radially through the side wall 150 of the nozzle 144, and includes a bend 152 of some 90 degrees therein in order to align the second or output end 130a of cable 128a with the concentric axis A of the nozzle 144. Any exposed length of the fiber optic cable 128a may be shielded with a light proof covering in order to prevent the radiation of light therefrom. It is apparent that the output end 130a of cable 128a can be placed externally on side wall 150 to provide greater illumination of the fluid receptacle into which the fluid is drawn.

The illumination of the beverage flowing from the tap outlet TO can provide a novel and desirable effect, particularly in the relatively low light conditions commonly found in bars and taverns. The illuminated beverage flow may serve as a novel means to attract attention to the beverage or other product, and be of value in advertising, marketing and other purposes.

As an alternative to the tilt switch 44, a mechanically actuated microswitch 154 may be used with the arcuately pivotable arm B of tap T. As the tap arm B is actuated forwardly and downwardly, the base of the arm B will assume the position shown by the broken lines B1 representing the actuated position of the arm base. This will cause the contacts of the microswitch 154 to close, thereby activating the light source as discussed above. Though not explicitly shown, it should be apparent that if arm B is clear or translucent, then a second fiber optic cable may be used to illuminate the arm B as discussed above.

The resulting light output from the second or output end 130a of the fiber optic cable 128a may be an unfiltered white light, a single color of light, or a changing revolution of colors. A colored light, a selectively actuated color wheel, or a removable color filter slide or transparency, may be employed between the light source and the first or input end of the cable 128a to provide a colored illumination for the beverage being dispensed. The color of the illumination may be changed as desired for various occasions, such as green illumination for St. Patrick's Day. The present invention provides a decorative and eye catching means of advertising or marketing, and also provides illumination of a fluid flow in order to yield novel advantages for various purposes and in various fields and environments.

It is to be understood that the instant invention is not limited to the exemplary embodiments described above. It will be apparent to those skilled in the art that various modifications and variations are possible within the spirit and scope of the instant invention. For instance, the invention may alternatively include a push button switch contact, a capacitive sensing switch or a photo sensing switch to operate the light source. The fiber optic light conduits are preferably mounted externally of the tap. The instant invention encompasses any and all embodiments within the scope of the following claims.

I claim:

1. An illumination device for a fluid-bearing tap having a fluid control handle and an outlet, said fluid illumination device comprising:

a light source including a first lamp and a second lamp;

a first light conduit connected to the tap, said first light conduit being illuminated by said first lamp;

a second light conduit connected to the outlet of the tap, said second light conduit being illuminated by said second lamp; and a switch adjacent to the tap and communicating with said light source, said switch deactivating said first lamp and activating said second lamp when the tap is actuated;

wherein the tap is illuminated by said first light conduit when the tap is not actuated, and an area proximate to the outlet of the tap is illuminated by said second light conduit when the tap is actuated.

2. The illumination device of claim 1 wherein:

said switch includes a tilt switch disposed immediately adjacent to the fluid control handle, said tilt switch activating said light source when the fluid control handle is displaced to actuate fluid flow through the tap.

3. The illumination device of claim 2 further comprising:

delay means for introducing a relay operation time delay to a signal generated by said switch.

4. The illumination device of claim 3, wherein said delay means includes a capacitor and a reed relay, said capacitor being arranged in parallel with said reed relay.

5. The illumination device of claim 1 wherein said switch deactivates the illumination of said tap by said first light conduit while the tap is actuated.

6. The illumination device of claim 1 further including a color wheel having a plurality of colors; said color wheel being interposed between said light source and an input end of said first and second conduits; and a motor driving said color wheel so as to alternately interpose one of said plurality of colors between said light source and said input end of said first and second conduits.

7. An illumination device comprising:

a fluid-bearing tap having a tap handle and a tap outlet;

a light source including a first lamp and a second lamp;

a first light conduit connected to said tap handle, said first light conduit being illuminated by said first lamp;

a second light conduit connected to said tap outlet, said second light conduit being illuminated by said second lamp;

a switch adjacent to the tap and communicating with said light source, said switch deactivating said first lamp and activating said second lamp when said tap is actuated by said tap handle;

wherein said tap handle is illuminated by said first light conduit when the tap is not actuated, and the fluid from said tap outlet is illuminated by said second light conduit when the tap is activated.

8. The illumination device of claim 7 wherein:

said switch includes a tilt switch disposed immediately adjacent to said tap handle, said tilt switch activating said light source when said tap handle is displaced to actuate fluid flow through said tap.

9. The illumination device of claim 8 further comprising:

delay means for introducing a relay operation time delay to the signal generated by said switch.

10. The illumination device of claim 9, wherein said delay means includes a capacitor and a reed relay, said capacitor being arranged in parallel with said reed relay.

11. The illumination device of claim 7 wherein said switch deactivates the illumination of said handle by said first light conduit while said handle is actuated.

12. The illumination device of claim 7 further including means for continuously varying the coloring of the light of the light source interposed between said light source an input end of said first and second light conduits.

13. A fluid illumination device providing for the illumination of fluid from a tap having a flow control handle, a fluid conduit and an outlet, said fluid illumination device comprising:

illumination means for illuminating an area proximate to the outlet of the tap, said illumination means including an input end and an output end;

a light source including a first lamp and a second lamp, said first lamp providing illumination for said input end of said illumination means;

a portable nozzle installable over the outlet of the tap, said nozzle containing said output end of said illumination means;

means for illuminating the flow control handle, wherein said means for illuminating said flow control handle is connected to said light source and illuminated by said second lamp; and a switch adjacent to the handle and communicating with said light source, said switch activating said second lamp and deactivating said first lamp when said tap handle is displaced.

14. The portable, temporarily installable and removable fluid illumination device of claim 13 wherein:

said illumination means includes a fiber optic cable having an first end and a second end, said first end receiving light from said light source and said second end axially disposed within said portable nozzle, whereby the flow of fluid at the outlet of said portable nozzle is illuminated.

15. The fluid illumination device of claim 13 wherein said switch actuating said light source while the handle is physically displaced to start fluid flow through the conduit.

16. The fluid illumination device of claim 13 further comprising:

means for continuously varying the coloring of the fluid illumination interposed between said light source and said input end of said illumination means.

17. The fluid illumination device of claim 13 wherein:

a color wheel comprising a plurality of colors and interposed between said light source and said input end of said illumination means; and a motor driving said color wheel so as to alternately interpose one of said plurality of colors between said light source and said input end of said illumination means.

* * * * *